United States Patent [19]

Lawless

[11] Patent Number: 4,905,719

[45] Date of Patent: Mar. 6, 1990

[54] FLUOROCARBON PUMPING SYSTEM

[76] Inventor: James C. Lawless, 800 Old Springfield Ave., Summit, N.J. 07901

[21] Appl. No.: 338,494

[22] Filed: Apr. 13, 1989

Related U.S. Application Data

[63] Continuation of Ser. No. 139,390, Dec. 30, 1987, abandoned.

[51] Int. Cl.[4] .............................................. G05D 7/00

[52] U.S. Cl. ........................................ 137/1; 137/210; 417/65

[58] Field of Search ....................... 137/210, 1, 12, 14; 417/279, 251, 252, 65; 122/4 A

[56] References Cited

U.S. PATENT DOCUMENTS

| | | | |
|---|---|---|---|
| 2,033,094 | 3/1936 | DeMotte | 137/210 X |
| 2,467,413 | 4/1949 | Wildback | 137/210 X |
| 4,572,943 | 2/1986 | Hogfeldt | 122/4 A X |
| 4,637,346 | 1/1987 | Draper | 122/4 A |

*Primary Examiner*—Alan Cohan
*Attorney, Agent, or Firm*—Gene Warzecha

[57] ABSTRACT

A system and method for pumping liquid fluorocarbons and the like from a pressurized supply container to another container. The system compensates for the inherent vapor pressure drop occuring within any pressurized container of fluorocarbons as the fluorocarbons are pumped out. A phase conversion apparatus is provided to recirculate a portion of the liquid being pumped from the downstream side of the pump, through a phase conversion chamber into the supply tank in a vapor phase. This prevents a vapor pressure drop in the supply tank and avoids the flashing of the liquid into a gas at the discharge connection of the supply container. The invention also comprises an improved fluorocarbon gear pump and pressure regulation means. The gear pump utilized offset gear axes and porous gears to form a liquid film over the gears to prevent deleterious contact in the pump and extend useful pump life.

7 Claims, 9 Drawing Sheets

FLUROCARBON PUMPING SYSTEM

BACKGROUND OF THE INVENTION

This is a continuing application of application Ser. No. 139,390 filed Dec. 30, 1987, now abandoned.

1. Field of the Invention

This invention relates generally to apparatus and methods for manufacturing or repairing fluorocarbon based systems. In particular, the invention relates to a system utilizing an improved apparatus and method for pumping liquid fluorocarbons and the like from a supply container to a receiving container.

2. Description of the Prior Art

Materials generally known as fluorocarbons are well-known and useful for many purposes. Fluorocarbons are a class of chemical compounds containing carbon and fluorine and are, for example, used in the manufacture of resins and plastics as well as in such widely varying areas as propellants in aerosol containers, lubricants, refrigerants and fire extinguishing materials. In each instance, fluorocarbons are contained in a pressurized container in a liquid state and may be either pure or mixed with an active ingredient (such as a perfumed deodorant, when used as propellant in an air freshener). As will be understood below, the term "fluorocarbon" as used herein includes materials generally known as "halons" when used in the fire suppressant industry.

Regardless of the end product, all products utilizing fluorocarbons require that the fluorocarbon be transferred from or between various pressurized containers during either the manufacture or repair of the product. Because of the characteristics of fluorocarbons, the flow rate of any such transfer is inherently limited, as will be understood below, and it is an object of this invention to overcome this inherent limitation.

In the manufacture of products utilizing fluorocarbons, it is obviously necessary to transfer the desired fluorocarbon from a bulk storage container to a more conveniently sized product containers. It is desirable to maximize the transfer flow-rates to increase manufacturing efficiencies. It is an object of this invention to improve manufacturing processes by increasing the inherently limited flow rates of fluorocarbons.

In repairing a product utilizing fluorocarbons, the pressurized container of fluorocarbon has, using prior art techniques, generally been vented to the atmosphere, releasing the fluorocarbon in its vapor state, to enable the repair to be made, and then the product container is refilled with a new supply of the desired fluorocarbon. Not only is such a practice wasteful and inefficient, but it is expected that government regulations will be enacted to prohibit such venting. Vaporized fluorocarbons have long been identified among the leading causes for depletion of the ozone layer of the atmosphere. The governmental regulations constitute an effort to regulate the use of fluorocarbons and the circumstances under which they may be released in the atmosphere.

The expected regulations generally require that in repairing fluorocarbon based systems, the fluorocarbon cannot be released into the atmosphere, but must be somehow placed into temporary holding tanks until the repair is completed and then returned to the system. Some products, for example, large refrigeration systems, may contain more than 1,000 pounds of liquid fluorocarbon and moving this amount into temporary holding tanks utilizing known technology requires many hours. It is, therefore, another object of this invention to increase fluorocarbon flow rates in order to decrease necessary repair times.

Thus, it is obvious that the movement or transfer of liquid fluorocarbons between containers is necessary for many purposes. Because of the fact that fluorocarbons are generally used in pressurized containers, any movement of the material is usually achieved by pumping. As will be shown, all of the known pumping techniques are affected by the vapor pressure inherent in containers of pressurized fluorocarbons.

All liquids will, at certain ambient pressures and temperatures, exhibit liquid and vapor states, each exerting a discrete pressure on the container of the liquid. From standard pressure, volume, temperature relationships, it is well known that for any given pressure, the temperature at which a liquid begins to boil is that at which its vapor pressure equals the ambient pressure. Fluorocarbons are especially sensitive to changes in liquid pressure. As the ambient pressure increases, the boiling temperature increases. As the pressure above the liquid surface decreases, as by removing liquid from the fluorocarbon container, the boiling temperature decreases. If the pressure drops enough, the liquid will boil even at room temperature.

In most situations in which it is necessary to move or pump liquid fluorocarbons, the supply tank is provided with a liquid output port and a vapor port while the receiving tank is only provided with a liquid input port. Four methods are known in the prior art for pumping liquid fluorocarbons from supply tanks to receiving tanks having no vapor port: (1) simple, unaugmented pumping, (2) pumping liquid and recirculating a portion of it back to the vapor inlet port of a supply tank, (3) pressurizing the vapor port of the supply tank with nitrogen or other gas and (4) heating the supply tank externally. The latter three techniques utilize some external augmentation to increase the flow rate. Each of these methods has some disadvantages as will be shown below.

When a liquid fluorocarbon is simply pumped from a pressurized supply container, the pressure in the vapor space above the liquid drops as the liquid level goes down. This causes boiling and bubbles (i.e. flashing) form in the discharge or liquid output pipe, reducing the flowrate. As will be understood below (with respect to FIG. 6) there is also an inherent pressure drop merely due to the passage of the liquid through the valve orifice. The liquid is initially saturated (i.e. at its boiling point) and as the pressure decreases, the saturation temperature decreases because of the pressure decrease and a portion of the liquid is vaporized because of the heat liberated by the temperature reduction. Thus, two phase flow occurs, with the ratio of the phases changing continuously. The liquid flow rate necessarily decreases because the vapor phase occupies more volume than the liquid thus slowing the effective rate of the latter. FIG. 2 shows a well-known graph of flow rate versus pressure drop for several of the fluorocarbons in common use using a pump having a 35 pound/minute free flow rate. Fluorocarbon 13B1, generically known as bromotrifluoromethane ($CB_rF_3$), is commonly known under the name Freon 13B1, Freon being a trademark of E. I. du Pont de Nemours & Co. (The line marked "R 12" is generically known as dichlorofluoromethane and "R 22" is dichlorodifluoromethane. Fluorocarbon 12B1 is bromochlorodifluoromethane). It will be noted that a pressure drop of 17 PSI causes a 50% reduction in flow rate of fluorocarbon 13B1 (i.e. 50% flashing), while a 35 PSI. drop causes a zero flow rate (100% flashing).

In utilizing the first method above, it is noted that when fluorocarbon 13B1 liquid is pumped from a supply container with no vapor return from the receiving container, the flow rate will follow the curve shown in FIG. 2. To demonstrate the inherent, unaugmented flow limitation of this substance, the 13B1 curve of FIG. 2 is repeated in FIG. 3 along with a curve showing the calculated rate of vaporization of liquid fluorocarbon 13B1 caused by ambient, unaugmented heating of a standard one ton supply container (i.e. 7′ long cylindrical steel tank, 2.5′ diameter, ½ full). It will be understood by those of ordinary skill in the art that the vaporizaton curve is plotted by calculating the heat absorbed by the surface area of the tank using standard engineering data (and FIG. 5). The intersection of these two curves shows the sustained unaugmented flow rate possible under the given conditions. From the graph, it can be seen that approximately 7.5 pounds per minute is the maximum possible flow with no vapor return (even if one uses a pump of larger capacity than 35 #/min). Any greater flow rate will pull a vacuum in the supply container and thereby create bubbles to in turn reduce the flow rate. FIG. 4 shows similar curves for fluorocarbon 12B1 with a theoretical sustained flow rate of 1.5 pounds per minute. This rate also does not depend upon the rating of the pump but rather on the flashing and heat absorbing rate of the fluorocarbon supply tank. As will be understood below, while a theoretical pumping rate is possible, as a practical matter fluorocarbon 12B1 cannot be pumped but must be pressurized out of the supply container. In this method the vapor pressure is not augmented by any external (i.e. active) apparatus.

In utilizing the second method above, the liquid is pumped as before, but a portion of it is passed through a throttle valve back to the vapor return of the supply tank. The amount of vapor produced depends on the amount of heat which can be passively absorbed by the pipes and the liquid flowing therein from the surrounding environment. The throttle valve is adjusted to try to obtain a liquid flow rate or spray that can be vaporized by the available ambient heat. While more efficient in heat absorption than the previously described method, this method will, at best, produce only a small amount of vapor to be fed back to the vapor return of the supply container. The net result is that only a small increase in the pumping rate shown in FIGS. 3 and 4 is realized. It will be understood by those skilled in the art that this will result in an increase for fluorocarbon 13B1 from 7.5 to approximately 11 pounds per minute and for fluorocarbon 12B1 from 1.5 to approximately 3 pounds per minute.

In utilizing the third method above, an external gas source (usually nitrogen) is connected to the vapor port of the supply tank which is then pressurized to hundreds of PSI above the vapor pressure. This either forces the liquid out of the supply tank without a pump or, if a pump is used, allows the full pumping capacity to be realized. If a pump is utilized, the (nitrogen) pressurization need not be as great as if no pump is utilized. The flow rates of some fluorocarbons are so greatly affected by pressure drops that they cannot be simply pumped without this method. For example, the aforementioned fluorocarbon 12B1 (bromochlorodifluoromethane), also known as halon 1211 for use in the fire extinguishing industry, "flashes" 100% to a gas upon a mere 1.8 PSI drop in pressure (see FIG. 2) so no liquid can be pumped. Fluorocarbon 12B1 has a vapor pressure of 20 PSI at room temperature and may, therefore, be stored in relatively lightweight supply containers. Such containers are provided in a standard 1500# size which has a siphon tube 45″ long. Applying enough suction by a pump to draw the material from this tank will create a pressure drop of 1.8 PSI when the material rises to 27″ in the tube. Obviously liquid flow via pumping of fluorocarbon 12B1 is impossible with these known devices. Therefore, transfer of fluorocarbon 12B1 is achieved by pressurizing the supply tank with nitrogen (or another gas) to 200–300 PSI and forcing the liquid into the receiving tank. This is obviously a time consuming and costly procedure. Another disadvantage of this method is that the fluorocarbon becomes contaminated with nitrogen or any other gas used to pressurize the cylinder. There is, therefore, a need for more efficient pumping means for such low vapor pressure fluorocarbons.

The fourth method requires external heating of the supply tank to increase flow from the supply tank. The heat absorbed by the supply tank increases the temperature of the liquid, thereby raising the vapor pressure. The increase in flow is of the order shown in the throttling valve approach shown above. The main difficulty with this method is the large time lag from the start of heating until the vapor is at a high enough pressure to increase the flow. Also, very large amounts of heat are required due to the large mass of the supply containers.

It is, therefore, an object of this invention to produce an improved system and method for pumping liquid fluorocarbons and the like. It is a further object of this invention to produce a system and method for pumping liquid fluorocarbons and the like at flow rates greater than inherently limited unaugmented flow rates. It is yet another object to produce an apparatus and method for quickly increasing the vapor pressure of liquid fluorocarbons and the like over a wide range of flow rates to compensate for pressure drops caused by pumping liquid from its container.

Another feature of the invention relates to the actual pump utilized. In transfer pumping of fluorocarbons from supply tanks to vented receiving tanks, little or no pressure head is encountered because both tanks have vapor ports and a vapor hose is usually connected from the top of the receiving tank to the top of the supply tank to equalize the vapor pressure. The low pressure head that the transfer pump works against puts little stress on the pump, allowing for relatively long pump life. However, in most instances as mentioned above, simple transfer pumping is not suitable because receiving tanks or containers are not provided with vapor ports and the pressures associated with such pumping create great stress on pumps, considerably reducing their useful life.

Additionally, pumps used for pumping most liquid fluorocarbons cannot be sufficiently lubricated to minimize wear and tear. The fluorocarbons tend to act as solvents of any lubricants within the pumps. Consequently, manufacturing tolerances being what they are, any pump used for pumping fluorocarbons quickly begins to wear out due to friction and mechanical interferences: these effects being exacerbated with time.

The most common type of pump used for fluorocarbons is a piston pump. To a lesser extent, diaphragm, vane, and gear pumps are also used. The difficulty with piston pumps is that they have a limited life due to the friction between the metal-to-metal or metal-to-carbon parts. Pump life expectancy of ten to fifteen hours of operation at five to twelve pounds per minute of flow is typical. This translates to approximately fifteen thousand pounds (approximately 7 standard, one ton containers) of pumping before the pump must be rebuilt. Another disadvantage of a piston pump is vaporlock since the valves in a piston pump are much smaller than the piston, thereby causing flashing of the liquid to a vapor due to the pressure drop through the valves. There is a need for an improved fluorocarbon pump capable of longer useful life.

Increasing the flow rates at which liquid fluorocarbons may be pumped is advantageous for the reasons stated above, but the extent of the improvement to the fluorocarbon pumping system would be enhanced even more if an improved pump were available. It is, therefore, also an object of this invention to produce an improved pump capable of sustaining longer continuous operation than is known with prior art pumps.

SUMMARY OF THE INVENTION

These and other objects of the invention are provided by the preferred embodiment thereof which is a system for pumping liquid fluorocarbons from a first container having a first liquid port and a vapor port to a second container having a second liquid port, the system including a pump interposed in a liquid output line joining said first and second liquid ports, the improvement comprising means for tapping said liquid output line at a point downstream of said pump conduit means connected to said tapping means for diverting a predetermined portion of the liquid output of said pump; conversion means connected to said diverting conduit means for converting substantially all of said predetermined portion of said liquid output into its vapor state; conduit means connected to said conversion means and said supply container for returning said predetermined vapor state portion to the vapor port of said supply container to increase the vapor pressure therein.

The invention also includes the method of pumping liquid fluorocarbon from a first container having a liquid port and a vapor port to a second container comprising the steps of: (a) pumping the liquid from said first port to said second liquid port; (b) diverting a predetermined portion of the pumped liquid through a heating means for converting substantially all of same to its vapor state; (c) returning the vapor from said heating means to said vapor port of said first container.

An additional embodiment of this method includes the additional steps of (d) determining the rate of liquid flow from said first liquid port; (e) determining the pressure drop within said first container associated with said liquid flow rate; (f) determining the vapor volume flow rate equivalent to said liquid flow rate, thereby determining the vapor volume which must be returned to said first container to at least compensate for the pressure drop associated with said liquid flow rate; and (g) determining said predetermined portion of the pumped liquid which must be diverted and vaporized in order to produce said compensating volume of vapor.

Another embodiment of this invention is provided by a liquid gear pump having the axes of its gears being laterally offset relative to the inlet and outlet ports of the pump to produce a smaller available volume for containing the liquid on the high pressure side of the pumping chamber than on the low pressure side thereof thereby forcing liquid into the space between the sides of the gears and the pumping chamber.

An additional embodiment of this invention is provided by a incorporating into said liquid gear pump porous gears which are sufficiently porous to enable liquid fluorocarbon being pumped through said gear pump to penetrate through said gears in order to produce a liquid film interface between said gears and said pumping chamber.

DESCRIPTION OF THE PREFERRED EMBODIMENT

Figure 1:
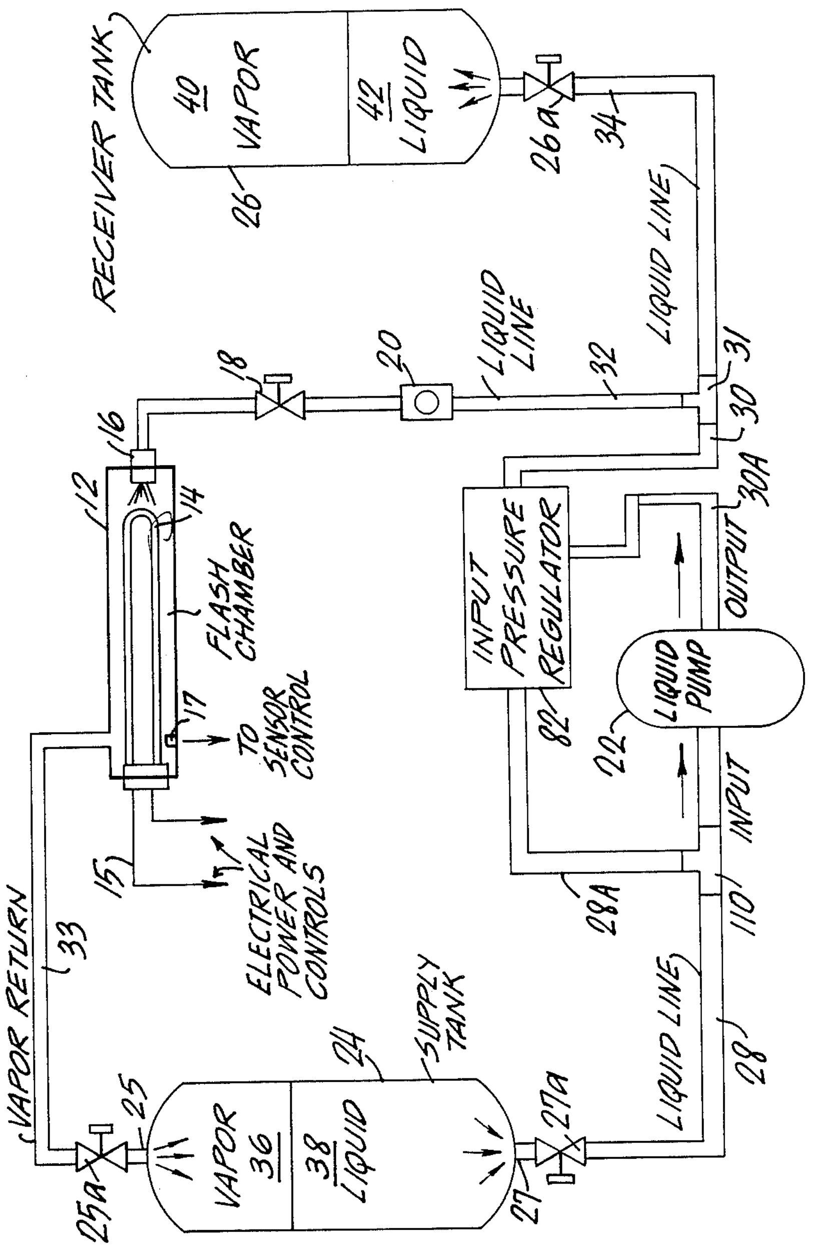
FIG. 1 is a schematic diagram of a liquid fluorocarbon pumping system constructed in accordance with the principles of this invention.

Referring now to FIG. 1, there is shown a preferred embodiment of a liquid fluorocarbon pumping system constructed in accordance with the principles of this invention. Pumping system 10 includes supply tank 24, liquid pump 22, receiver tank 26 and a heating or flash chamber 12. Supply tank 24 has a vapor port 25 and a liquid port 27 and contains vapor 36 and liquid 38 which is drawn out of tank 24 by pump 22 via pump input line 28 and transferred to receiver tank 26 through a pressure regulator 82 via pump output lines 30A, 30 and 34. A reference pressure line 28A is connected between line 28 and regulator 82, the operation of which will be explained below with respect to FIG. 7. Flow control valves **25*a*, 27*a* and 26*a*** are interposed in the lines as shown.

In operation, pump 22 necessarily develops a positive output pressure with respect to the input of the pump. Some of the pump output is diverted from line 30 through a "T" connector or other tapping means to liquid line 32 and flash chamber 12. Flow meter 20 and valve 18 are operatively interposed in line 32 between "T" connector 31 and flash chamber 12. Spray nozzle 16 is connected to the end of line 32 within flash chamber 12 and atomizes the diverted liquid into a spray. Flash chamber 12 also houses heater 14, operatively connected via power lines 15 to a source of electrical power and controls associated therewith (not shown). Sensor 17 is situated in flash chamber 12 and connected to sensor controls (not shown) to sense the conditions within the flash chamber and control its operation accordingly. In the preferred embodiment, heater 14 is a conventional heating coil encased within a thermally conductive cover resistant to any deleterious effects of the fluorocarbon. Heater 14 is used to relatively instantaneously vaporize substantially all of the impinging liquid spray. Vaporized liquid has a volume from approximately ten to one hundred times that of the liquid phase depending upon the type of fluorocarbon. Thus, vaporizing only a portion of the liquid being pumped from tank 24 is sufficient to produce a vapor volume equivalent to the liquid volume decrease in the tank. The vapor phase is returned to vapor port 25 of supply tank 24 via the vapor return line 33 in order to pressurize or super-pressurize the supply tank. The term "vapor port" refers to any opening in the supply tank which opens to the outside of the tank from a space above the liquid level in the tank.

For proper operation of the invention, it is not essential that all of the liquid sprayed into the flash chamber be converted to its vapor state. Thus, if more than the required amount of liquid flows through flow meter 20 and a portion of it is not vaporized but, instead, flows with the vapor back to supply tank 24, the tank may still stay sufficiently pressurized.

Figure 5:
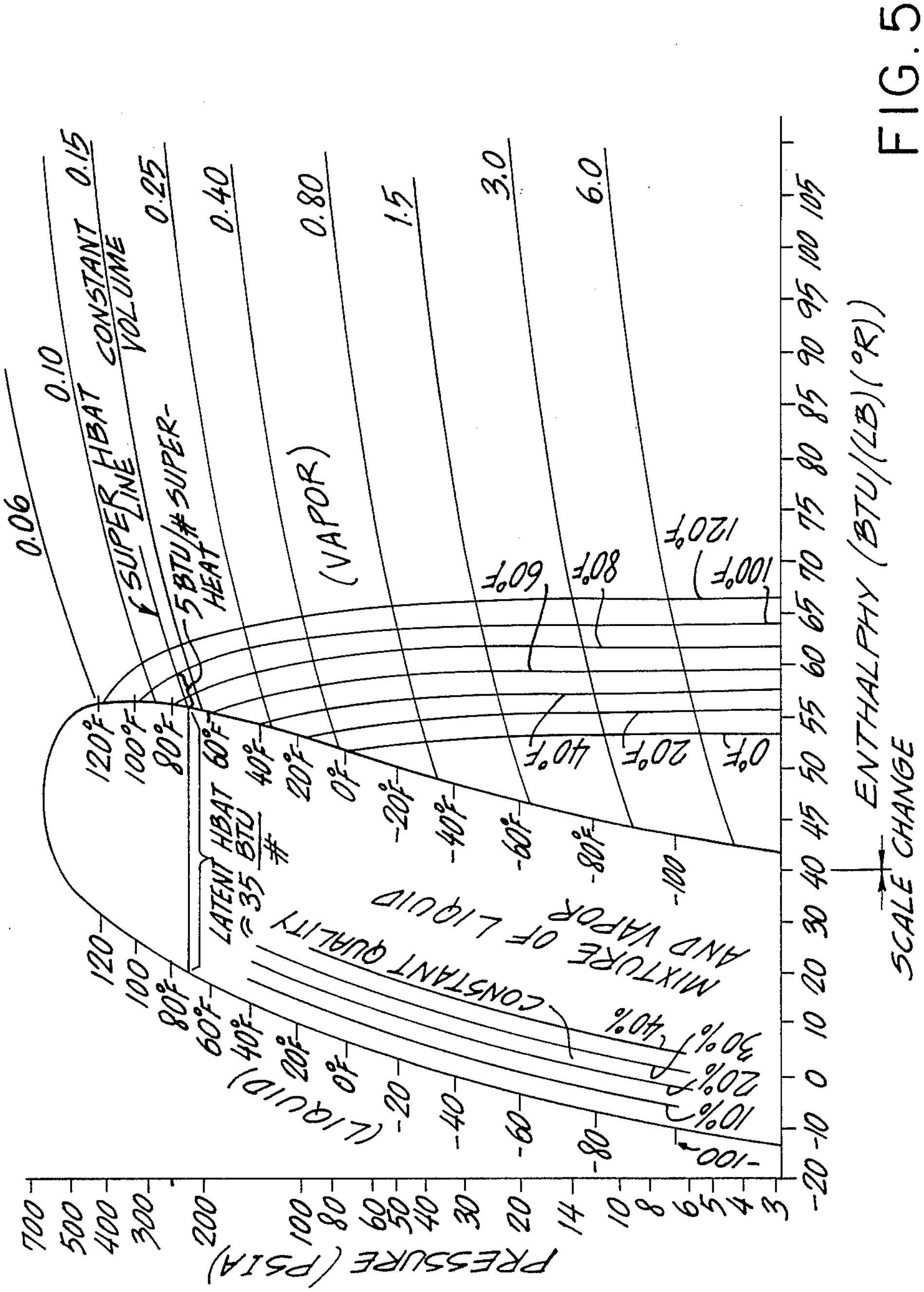
FIG. 5 is a graph of pressure vs. enthalphy for fluorocarbon 13B1.

FIG. 5 is a portion of the pressure vs. enthalpy graph of Freon 13B1 published by the manufacturer, Dupont. From the data available in this graph and associated published tables and other data, various computations may be made to determine the rate at which liquid must flow through flow meter 20 and be converted to vapor in flash chamber 12. A representative example of the flow rate calculations for fluorocarbon 13B1 is shown below utilizing the following given data:

Temperature: 70° F.
Vapor pressure: 213.7PSIA
Liquid density: 97.79 #/$ft^3$
Liquid volume: 0.01023 $ft^3$/#
Vapor volume: 0.1344 $ft^3$/#
Volume ratio: 13.14
Enthalpy (latent): 35.49 BTU/#

Figure 2:
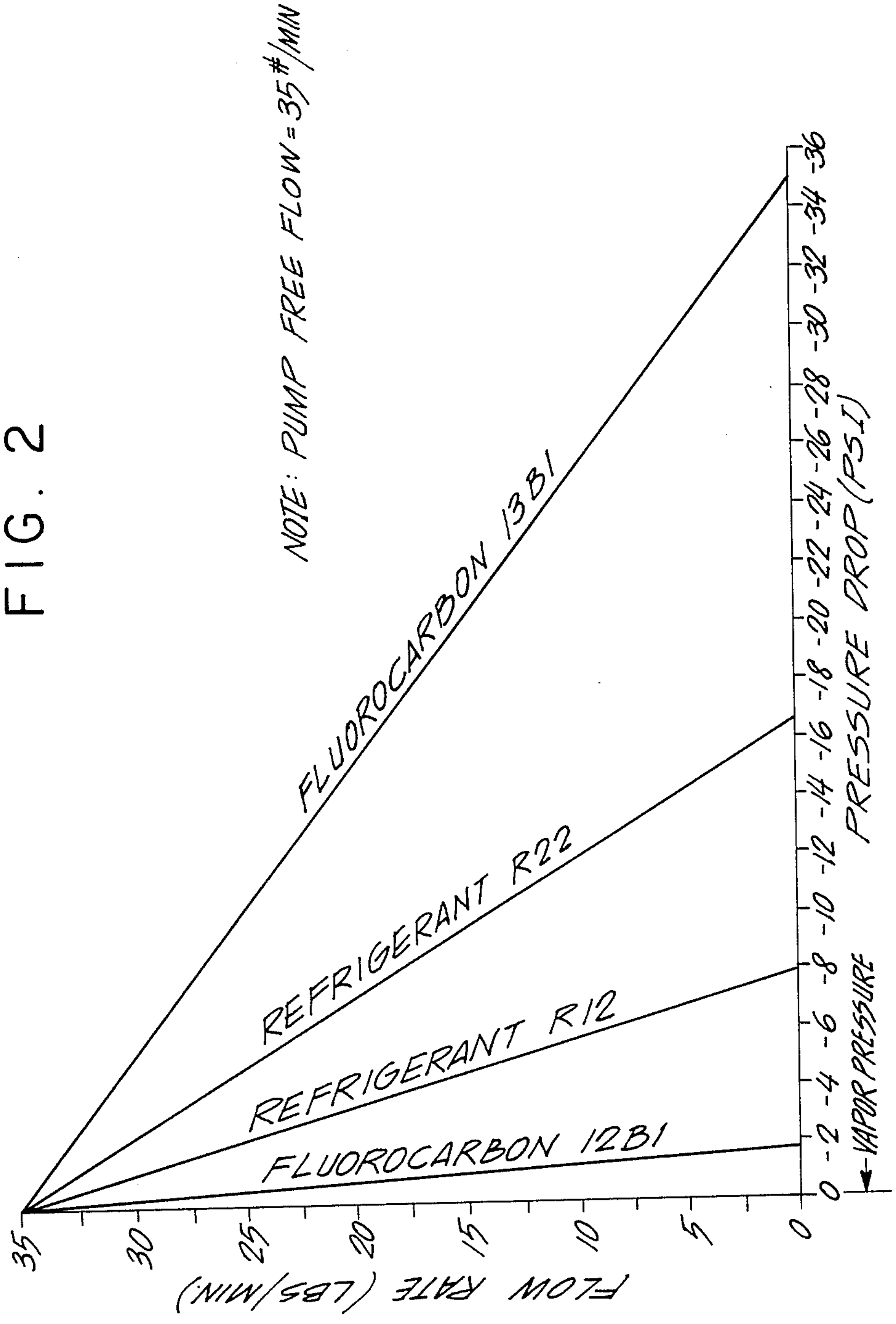
FIG. 2 is a graph of flashing limited flow rate vs. vapor pressure drop for several of common fluorocarbons.
Figure 3:
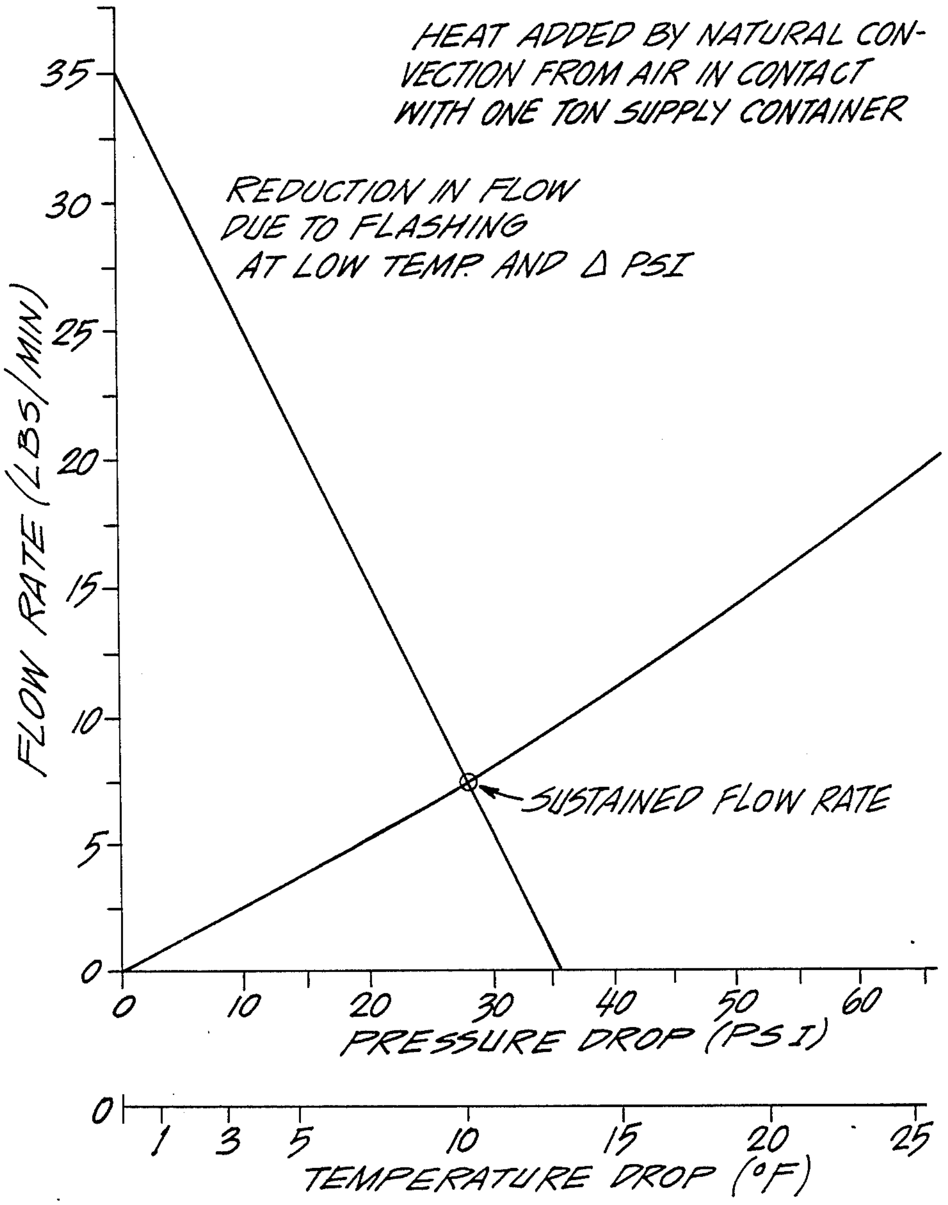
FIG. 3 is a graph showing the sustained, unaugmented flow rate of fluorocarbon 13B1 due solely to ambient, passive heating of a standard supply container.
Figure 4:
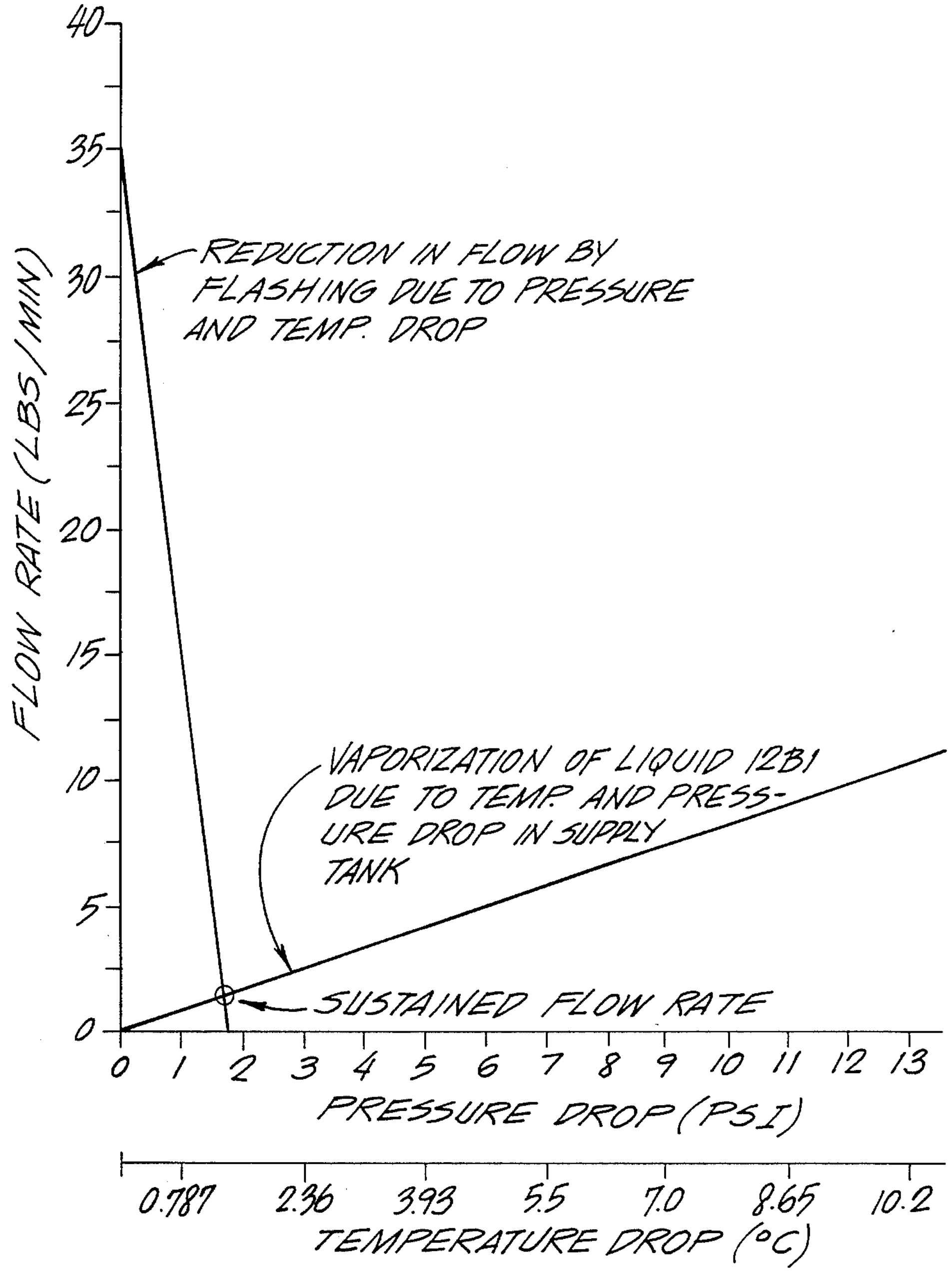
FIG. 4 is a graph showing the sustained, unaugmented flow rate of fluorocarbon 12B1 due solely to ambient, passive heating of a standard supply container.

In one preferred embodiment of the invention, there is utilized a pump capacity of 35#/min and a supply tank orifice of 0.275". At a flow rate of 35#/min the rate of displacement of liquid from the tank will be 35#/min × 0.01023 $ft^3$/# = 0.35805 $ft^3$/min. This is equivalent to 2.66#/min of vapor [0.35805 $ft.^3$/min ÷ 0.1344 $ft^3$/#] which must be recirculated to maintain the pressure in the supply tank. If the pressure is maintained, there will be no pressure drop and, by reference to FIG. 2, it will be noted that the maximum flow rate of the pump may be maintained. Flow meter 20 may be set to produce a liquid flow of 2.66#/min. since the weight of liquid equals the weight of vapor. Multiplying this by the known latent heat (35.49 BTU/#) gives the heat required as 94.53 BTU/min. Using the known electrical conversion rate of 17.57 watts/BTU/min produces a required heater power of 1661 watts to convert the calculated quantity of liquid to a sufficient amount of vapor to eliminate the pressure drop in the supply tank.

Figure 6:
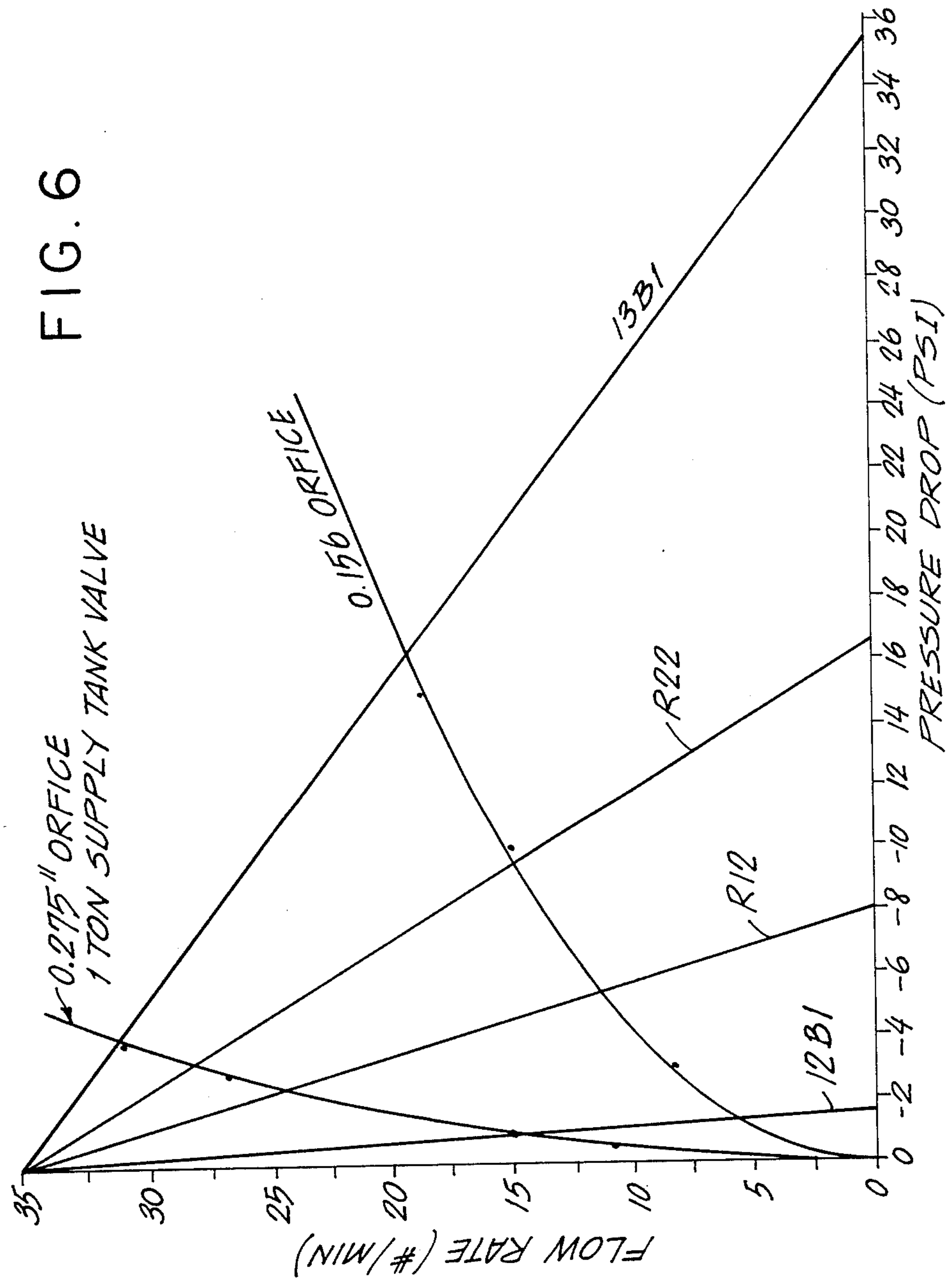
FIG. 6 is a graph of flow rate vs. pressure drop showing the effect of flow through a 0.275" and a 0.156" valve orifice for various fluorocarbons.

The foregoing describes the system operation to compensate for the primary pressure drop caused by the pumping operation. However, in addition to the primary pressure drop, there are also secondary pressure reductions due to various supply tank constructions. For example, some tanks utilize siphon tubes and/or check valves which create some additional pressure drop. Also, a pressure drop is created merely due to liquid flow through the supply tank orifice in valve 27a. For example, as shown in FIG. 6, a 0.275" orifice reduces pressure for fluorocarbon 13B1 by approximately 4 PSI and flow to approximately 31#/min. Additional heat of 5 BTU/# is supplied to superheat the vapor and pressurize the tank an additional 15 PSI, as shown in FIG. 5, to more than compensate for the losses through the valve (and pressure drops due to other tank construction effects). This additional heat requires an additional 233.68 watts to be supplied to the heater (5 BTU/# × 2.66#/min × 17.57 watts/BTU/min = 233.68 watts).

Figure 7:
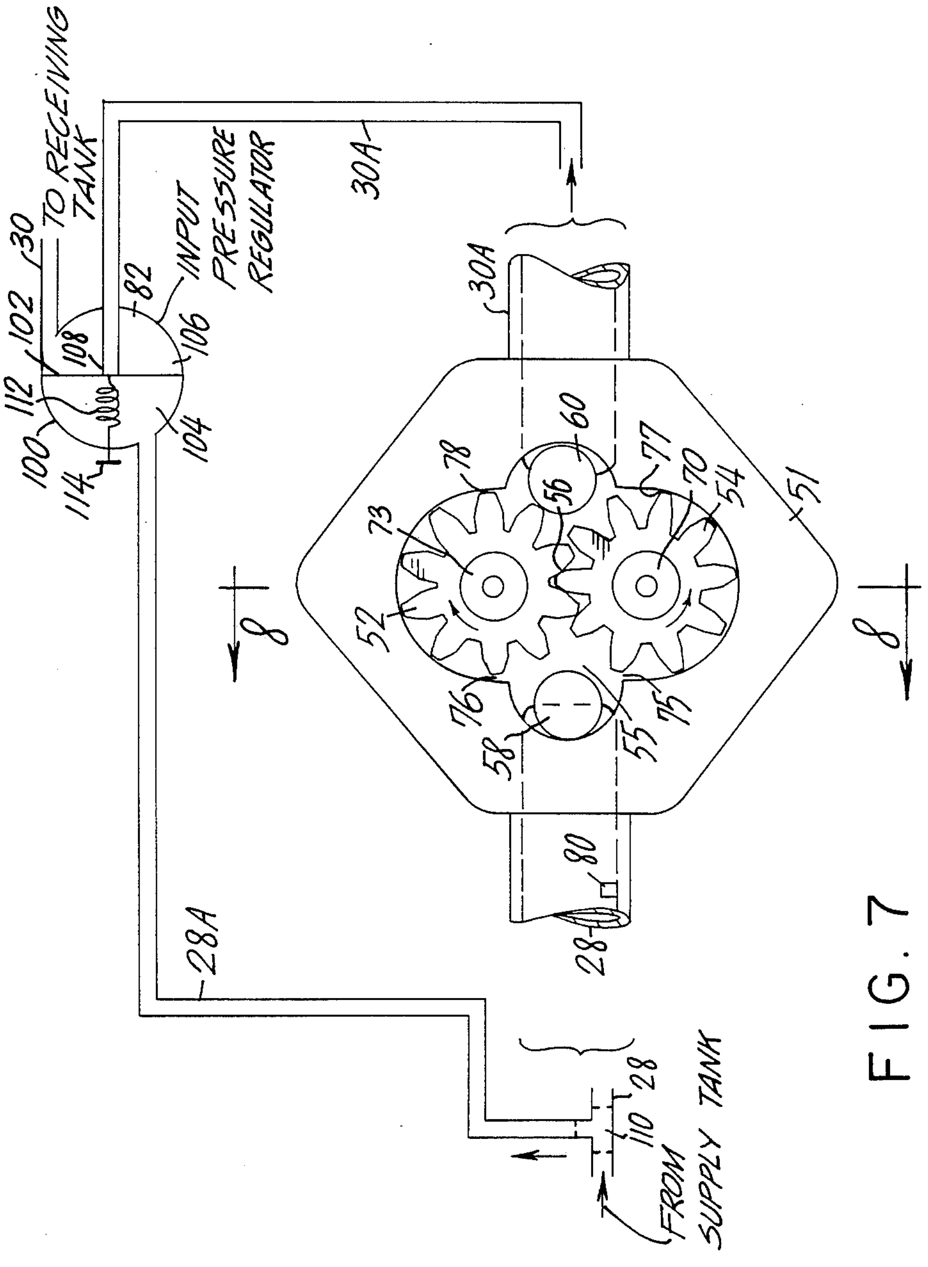
FIG. 7 is a schematic plan view of a portion of a preferred embodiment of a gear pump constructed in accordance with the principles of this invention.
Figure 8:
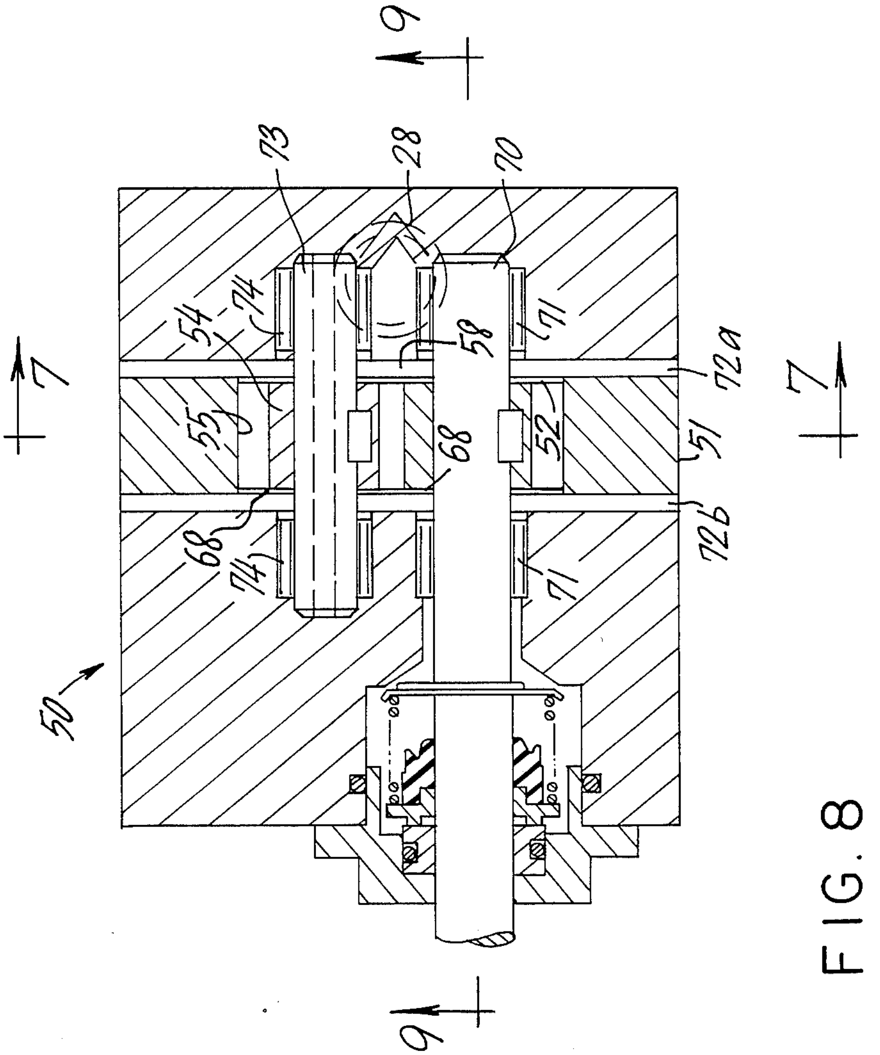
FIG. 8 is a schematic cross-sectional view of FIG. 7 taken along the line 8—8.
Figure 9:
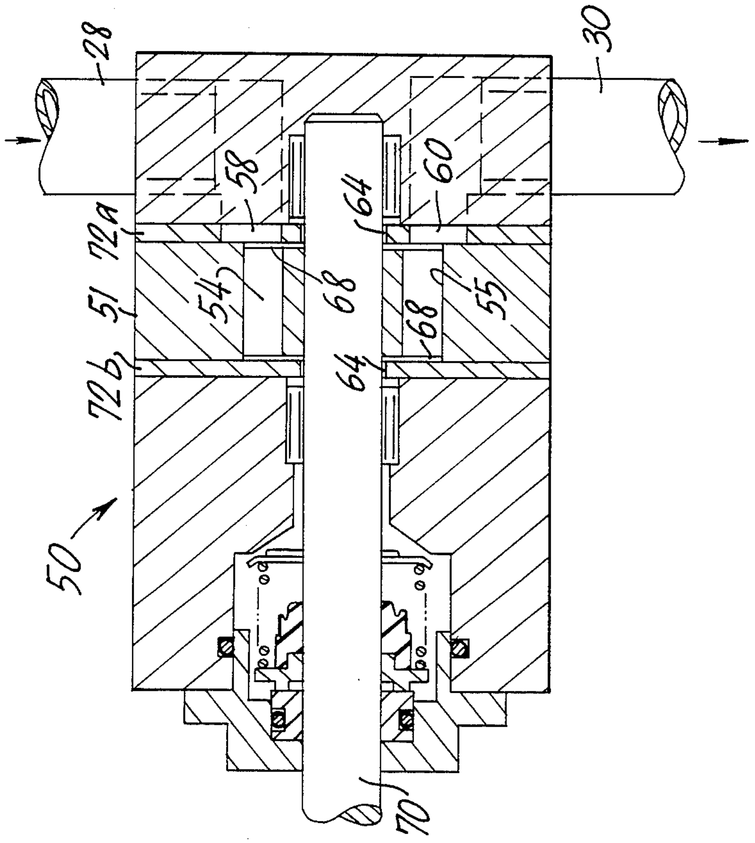
FIG. 9 is a schematic cross-sectional view of FIG. 8 taken along the line 9—9.

Referring to FIGS. 7, 8 and 9 there is shown a preferred embodiment 50 of pump 22 constructed in accordance with the principles of this invention. Pump 50 is a gear pump having a gear housing 51 and, side plates 72a and 72b forming a pumping chamber 55, and having a driven gear 54 and drive gear 52. Gear 52 is connected to drive shaft 70 which is mounted in conventional bearings 71 connected to a conventional drive motor (not shown). Gear 54 is mounted on idler shaft 73 which is set in bearings 74. The gears are formed by pressing powdered metal in a forming die using conventional techniques. In the preferred embodiment the powdered metal used is steel, although other materials may be used provided the porosity is sufficient to enable fluorocarbons to penetrate the gears a will be understood below. The housing itself may be made of porous, powdered metal and may be sealed using conventional impregnation techniques. The liquid input or low pressure port 58 in side plate 72a is connected to the supply or input liquid line 28 (seen in FIG. 1). Liquid output or high pressure port 60 in side plate 72b is connected to liquid output line 30 or 30a as will be best understood below which is connected to the receiving tank. Ports 58 and 60 must be clear of the gears. That is, no portion of the gears should be seen looking into either port 58 or port 60 from the right in FIG. 9 (best seen in FIG. 7). Otherwise, the high back pressure will have a tendency to slide the gears on their respective shafts towards the side plate 74 opposite port 60, thereby eliminating the normal clearance space or gap 68 and causing deleterious contact. The direction of gear rotation is shown by the arrows and the operation of pump is conventional in this regard: the liquid enters port 58 (the low pressure side) and is carried to port 60 (the high pressure side) around the periphery of gears 52 and 54. As in conventional gear pumps, pump 50 has shaft clearance gaps 64 between the gear shafts and the side plates. Excess liquid fluorocarbon flows through these gaps to cool the needle bearings 71 and 74 supporting the shafts and ultimately is returned to the low pressure input port.

Gears 52 and 54 are unsymmetrically placed within the pumping chamber 55 in the gear housing to produce relatively large gaps 75 and 76 between the tips of the teeth of gears 52 and 54, respectively, and the closest portion of housing 51 on the low pressure side of the pump. This produces relatively smaller gaps 77 and 78 between the teeth of gears 52 and 54, respectively, and the closest portion of housing 51 on the high pressure side of the pump. In the preferred embodiment, gaps 75 and 76 are on the order of 0.003" and gaps 77 and 78 are on the order of 0.001". It will be understood that, as the gears rotate, a "wedge" effect is thus produced since the space between the tip of the gears and the housing 51 gets progressively smaller as it approaches the high pressure side.

The space 68 between the sides of gears 52 and 54 and the side plates is, in the preferred embodiment, on the order of 0.0015", similar to conventional gear pumps.

However, because there is a greater volume of liquid at the input than the output due to the wedge effect, the pumped liquid is, because of the high pressure adjacent port 60 and the spacing of the side plates, forced to flow into gaps 68. This is due to the action of the liquid penetrating through the porous gears as well as being forced transversely over the edge of the gears over substantially the entire periphery of the gears. This enables the formation of a hydrostatic or liquid film interface between the gears at point 56 and between the gears and the side plates thus acting to force the gears away from adjacent parts and center them within the pumping chamber thereby eliminating deleterious contact and extending pump life. Fluorocarbons are very thin, low viscosity liquids (on the order of 0.3 centipoise) and readily flow through the porous gears. However, even without using porous gears, while the fluorocarbon is not necessarily acting as a conventional lubricant, the invention does enable the liquid fluorocarbon to isolate the gears from contact with adjacent parts. In the preferred embodiment a minimum pump pressure differential of approximately 50 PSI is necessary to create enough back pressure to enable most efficient operation. A pressure regulator 82 is connected to input and output lines 28 and 30 in order to maintain the desired pressure differential even upon system start-up when there may be a momentary insufficient pressure differential. While the porosity of the gears provides some liquid film interface even at low pressure differentials, it is preferable to operate the pump at a pressure differential of at least 50 PSI in order to increase the aforementioned "wedge" effect.

Pressure regulator 82, as schematically shown in FIG. 7, is a modification of a known input pressure regulator and comprises an enclosure 100 having a movable diaphragm 102 which divides the enclosure into two isolated chambers 104 and 106. The output of pump 22 is fed to regulator 82 via conduit 30A and from the regulator to the receiving tank via conduits 30 and 34 (best seen in FIG. 1). The end 108 of conduit 30A opens into output chamber 106 against one side of diaphragm 102 and line 30 is connected to an aperture in chamber 106. Input chamber 104 is similarly connected via conduit 28A to a "T" connection 110 in line 28. The force with which diaphragm 102 sealingly presses against end 108 of line 30A is adjustable via a biasing spring means 112 and control handle 114.

In operation, spring 112 of regulator 82 is adjusted to provide the desired 50 PSI of pressure across pump 50. Input pressure into chamber 104 is supplied through line 28A and will be approximately the vapor pressure of the supply tank which, in the example of fluorocarbon 13B1 is 200 PSI. Thus, the pressure on the input (left) side of diaphragm 102 is approximately 250 PSI. Upon system start up without regulator 82 the pressure differential across pump 22 would be negative for some minutes until enough liquid was pumped into receiving tank 26 to create a positive pressure differential of 50 PSI. With regulator 82, spring 112 provides the means by which a 50 PSI positive pressure differential is created across pump 50 very quickly after start up because the pumped liquid is almost immediately resisted by diaphragm 102. Even as pressure builds to a steady state value of 200 PSI in the receiving tank, the pressure differential remains 50 PSI.

Use of regulator 82 significantly improves system performance by helping to eliminate flashing which may occur within the pump due to pressure drops below the input vapor pressure. Elimination of the vapor bubbles (caused by flashing) and the consequent reduction of liquid volume and flow rate serves to increase the liquid flow rate even over the improvement already provided by the previously described features of this invention.

It is possible to include a sensor 80 connected to a control system (not shown) in one of the liquid lines 28 or 30 to sense pressure and/or the presence of liquid so the pump may be shut off if there is insufficient liquid or pressure differential to permit proper pump operation.

It will be understood by those skilled in the art that numerous other modifications and improvements may be made to the preferred embodiment of the invention disclosed herein without departing from the spirit and scope thereof.

What is claimed is:

1. In a system for pumping liquid fluorocarbons and the like from a first container having a first liquid port and a vapor port to a second container having a second liquid port, said first and second liquid ports connected by a liquid output line, the system including a pump interposed in said liquid output line, the improvement comprising:

means for tapping said liquid output line at a point downstream of said pump;

first conduit means connected to said tapping means for continuously diverting a predetermined portion of the liquid output flow of said pump, said predetermined portion of the liquid output flow of said pump being that portion of said liquid output flow which, when converted to its vapor phase, will occupy a progressively increasing vapor volume, the rate at which said vapor volume increases being substantially equal to or greater than the rate at which the liquid volume of said first container decreases;

conversion means connected to said first conduit means for continously converting said predetermined portion of said liquid output flow into its vapor state;

a flow regulating means interposed between said pump and said conversion means for maintaining the liquid flow into the conversion means at substantially that rate of liquid flow which, when converted to vapor in said conversion means, will at least compensate for the decreased volume of liquid in said first container; and second conduit means connected to said conversion means and said supply container for continuously returning said predetermined vapor state portion directly to the vapor port of said supply container.

2. A system according to claim 1 wherein said conversion means comprises:

a housing having an inlet port and an outlet port, said inlet port connected to said first conduit means and said outlet port connected to said second conduit means;

dispersing means connected to said inlet port for dispersing said predetermined portion of said liquid output flow within said housing;

heater means situated within said housing, said heater means adapted to heat the liquid dispersed from said dispersing means sufficiently to vaporize substantially all of same in order to maintain or increase the vapor pressure in said first container at a predetermined level; and power means connected to said heater means for energizing same.

3. A system according to claim 2 further comprising:

sensing means operatively associated with said heater means for sensing the temperature of said heater means; and control means connected to said power means and said sensing means for regulating the power applied to said heater means.

4. A system according to claim 2 wherein said dispersing means comprises nozzle means for converting said predetermined portion of said liquid output flow into an atomized spray.

5. The method of pumping liquid fluorocarbon and the like from a first container having a first liquid port and a vapor port to a second container having a second liquid port, said first and second liquid ports connected by a liquid output line, comprising the steps of:

(a) pumping the liquid from said first liquid port to said second liquid port;

(b) diverting a predetermined portion of the pumped liquid from said liquid output line to a flow regulating means, said predetermined portion of the liquid output flow of said pump being that portion of said liquid output flow which, when converted to its vapor phase, will occupy a progressively increasing vapor volume, the rate at which said vapor volume increases being substantially equal to or greater than the rate at which the liquid volume of said first container decreases;

(c) maintaining the liquid flowing through said flow regulating means at a predetermined flow rate;

(d) converting, in an energized heating means, substantially all of the liquid flowing through said flow regulating means to its vapor state; and (e) returning the vapor from said heating means directly to said vapor port of said first container.

6. A method according to claim 5 further comprising the steps of (f) determining the rate of liquid flow from said first liquid port;

(g) determining the pressure drop within said first container associated with said liquid flow rate;

(h) determining the vapor volume flow rate equivalent to said liquid flow rate, thereby determining the vapor volume which must be returned to said first container to at least compensate for the pressure drop associated with said liquid flow rate;

(i) determining said predetermined portion of the pumped liquid which must be diverted and vaporized in order to produce said compensating volume of vapor and diverting that determined amount of pumped liquid.

7. The method of pumping liquid fluorocarbon and the like from a first container having a first liquid port and a vapor port to a second container having a second liquid port, said first and second liquid ports connected by a liquid output line, comprising the steps of:

(a) pumping the liquid from said first liquid port to said second liquid port;

(b) diverting a predetermined portion of the pumped liquid through an energized heating means for converting substantially all of same to its vapor state; and (c) returning the vapor from said heating means directly to said vapor port of said first container;

(d) directing the pumped liquid through a pressure regulating means to maintain a predetermined pressure differential across the pump, said regulating means having an adjustable biasing pressure means and a reference pressure means; and (e) connecting a liquid carrying conduit between said reference pressure means and the input to the pump.

* * * * *